Sept. 10, 1929.  R. E. BAKER  1,727,628
VALVE
Filed March 1, 1926  3 Sheets-Sheet 1

INVENTOR
Robert E. Baker
BY
Richey & Watts
ATTORNEYS

Sept. 10, 1929.　　　R. E. BAKER　　　1,727,628
VALVE
Filed March 1, 1926　　　3 Sheets-Sheet 3

INVENTOR
Robert E. Baker
BY Richey & Watts
ATTORNEYS

Patented Sept. 10, 1929.

1,727,628

UNITED STATES PATENT OFFICE.

ROBERT E. BAKER, OF CLEVELAND, OHIO, ASSIGNOR TO ARTHUR G. McKEE & COMPANY.

VALVE.

Application filed March 1, 1926. Serial No. 91,419.

This invention relates generally to valves for conduits for fluids, and more particularly to a valve comprising relatively movable conduit sections adapted to permit easy and quick manipulation of a cut-off shutter or gate.

In the drawings attached to and forming a part of this specification:

Figure 1:
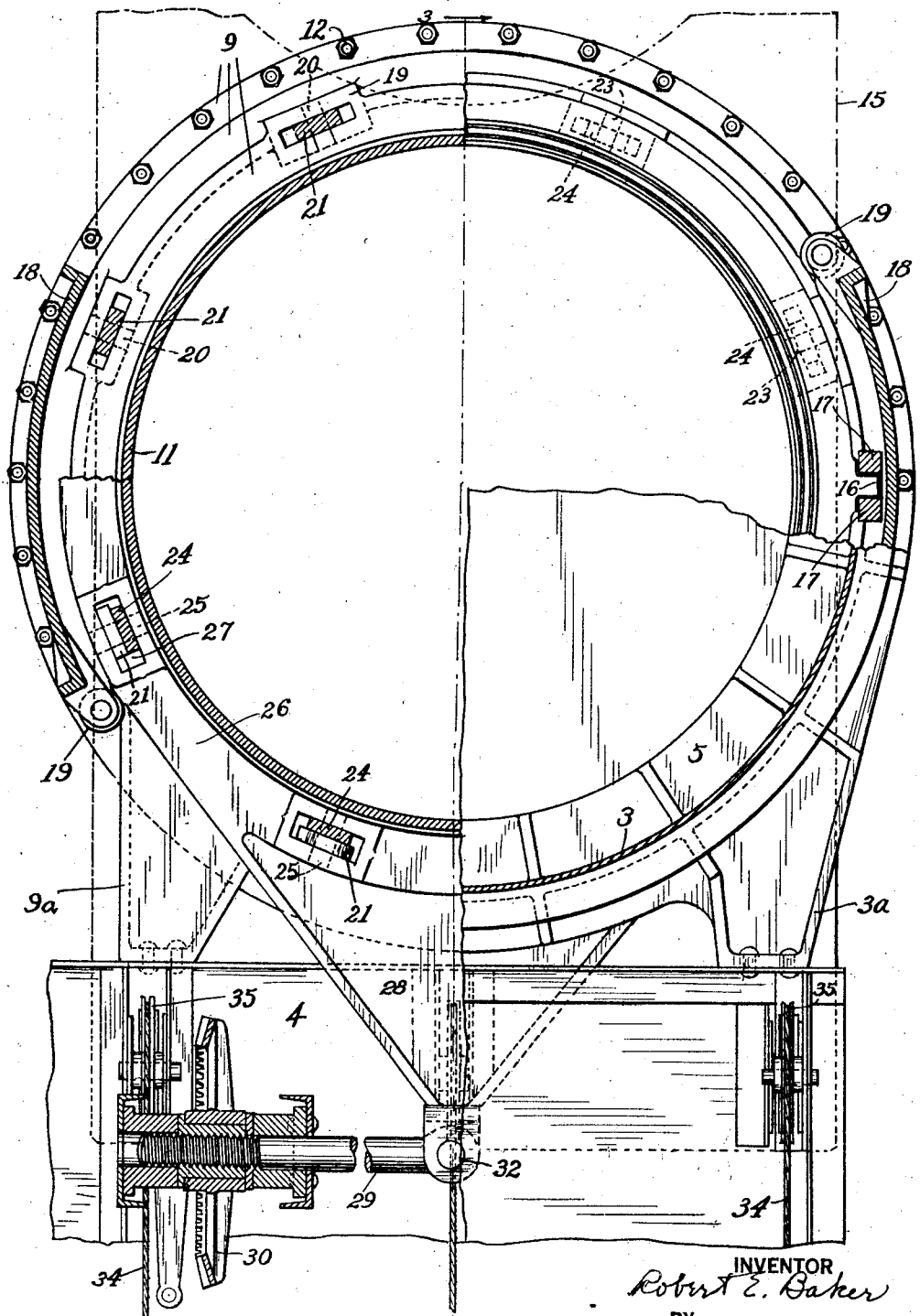
Fig. 1 is a transverse elevation, partly in section, of a conduit embodying my invention.
Figure 2:
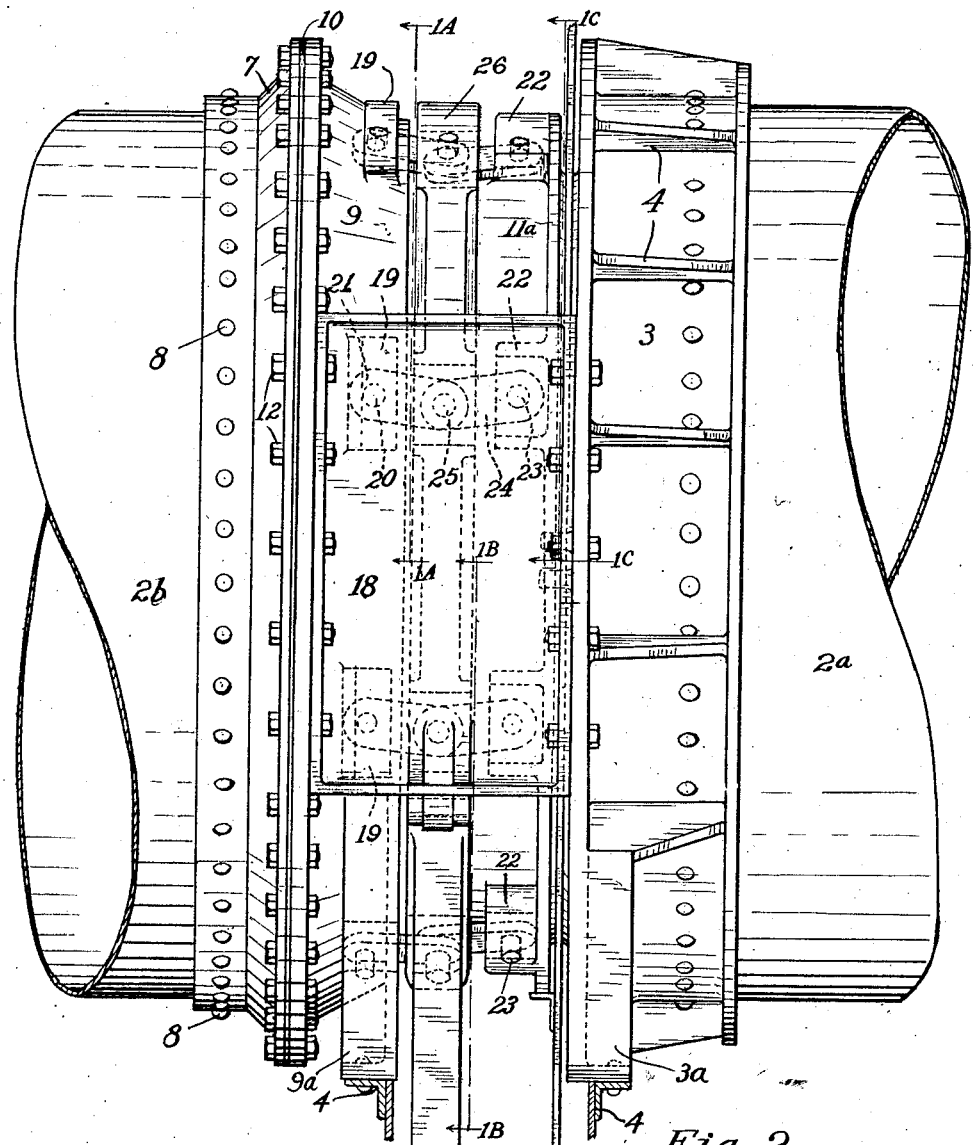
Fig. 2 is a side elevational view of the device shown in Fig. 1.
Figure 3:
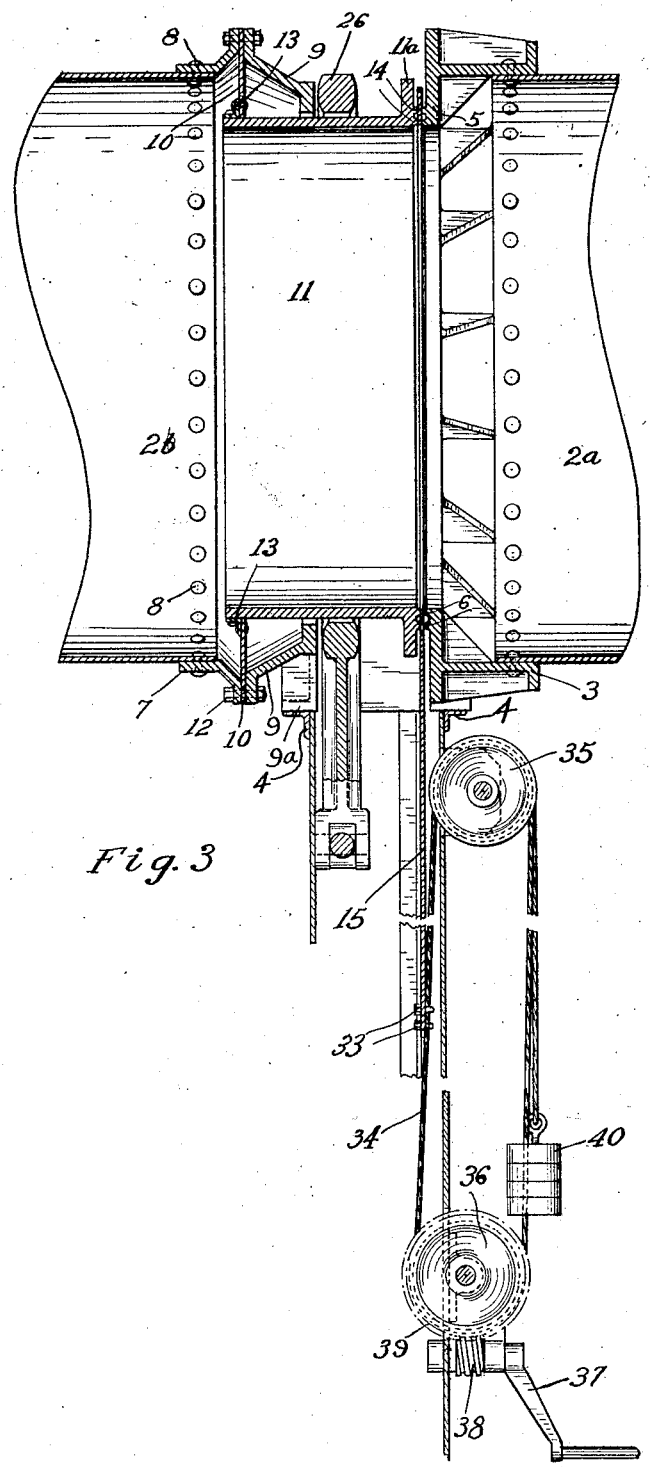
Fig. 3 is a longitudinal sectional view taken substantially on line 3—3 of Fig. 1.

In the drawings, $2^a$ and $2^b$ indicate stationary section of a gas conduit, which are here shown as being unlined but which may be provided with any suitable lining of brick or other material, when and as desired. To the end of one section $2^a$ is secured an annular casting 3 having suitable legs $3^a$ to rest on and be secured to a conduit supporting frame 4, and having an inwardly extending flange 5 provided with one or more (in this case two) annular seats 6 having narrow edges so as to make a substantially gas-tight connection with a gate or shutter 15 in the form of a plate of sheet metal. The other conduit section $2^b$ is provided at the end thereof adjacent to the section $2^a$ with means for forming a gas-tight connection with a movable conduit section, segment or link 11. As shown, this means comprises a ring 7, attached to the conduit $2^b$ as by rivets 8 or by any suitable means, a second ring 9 and an annular plate 10 of relatively thin, flexible sheet metal perforated centrally to receive and support one end of the movable conduit section, segment or link 11. Suitable bolts 12 may be employed to secure the rings 7 and 9 and plate 10 in assembled gas-tight relation while the conduit section, segment or link 11 may be secured with a gas-tight connection to plate 10 as by a ring 13 secured both to the plate and to the conduit section, segment or link 11. The ring 9 has legs $9^a$, similar to legs $3^a$ of ring 3, to rest on and be secured to the conduit supporting frame 4. It will be noted, by referring to Fig. 3, that the ring 9 at the side thereof adjacent to the ring 3 has an inside diameter slightly greater than the outside diameter of the conduit section 11, so that the conduit section 11 may move freely therethrough without contacting with the ring or section $2^b$. The end of the conduit section 11 adjacent to the ring 3 is supported on opposite sides thereof by projections 16 which rest on and are guided by two ribs 17 on the inner side of spacers 18. The conduit section 11 is provided with annular seats 14 on the end flange $11^a$ thereof adjacent to the corresponding seats 6 of ring 3. Between these two pairs of seats 6 and 14 is disposed a shutter or gate 15 of sheet metal plate provided with an opening in one end of substantially the same diameter as the inside diameter of conduit section 11 and mounted to be moved between the seats 6 and 14 to a position such that the opening therethrough will be outside of the conduit and a sheet metal closure will extend entirely across the conduit. Spacer members 18, in the form of curved plates, are interposed between flanges or parts of the rings 3 and 9 and secured to one or both of these sections and serve to fix the minimum distance between the adjacent conduit sections $2^a$ and $2^b$. Each plate 18 is provided with a roller 19, preferably disposed in a vertical plane, as more clearly shown in Fig. 1 and for a purpose presently to be described.

The ring 9 is provided on its exterior with a series of spaced lugs 19, each lug being fitted with a pin 20 which serves to secure one link of a toggle 21 thereto. The conduit section 11 carries on its exterior a series of upstanding lugs 22 to receive pins 23 which in turn secure links 24 of a toggle thereto. The lugs 19 and 22 correspond to each other in number and location and are arranged in pairs, of which any number desired may be employed, there being eight shown in the present drawings, certain of these pairs of lugs and their associated toggle links being disposed in the projection of the shutter as shown clearly in Fig. 1. The toggle links 21 and 24 have their adjacent ends secured together in pairs as by pins 25, which pins are carried by a toggle ring 26 which encircles the conduit section 11 and is provided with slots 27 to receive the toggle links 21 and 24. This toggle ring 26 has a bracket 28 extending downwardly from its lower central portion to which is attached a rod 29 carrying, at its free end, gearing suitable for moving the rod 29 to turn the toggle ring 26 relative to the conduits $2^a$ and $2^b$ and conduit section 11. This gearing, as shown, comprises a ring gear 30, a pinion 31 and a hand wheel 37, but it will be understood that any desired train of gears or actuating means may be used in lieu thereof. Inasmuch as the ring 26 does not rotate more than a very short distance in actual practice, the rod 29 may be operatively connected to the bracket 28 by a pin 32 or other connection sufficiently loose to give each of these members the required relative motion and movement. By referring to Fig. 1 it will be noted that the toggle ring 26 has a bearing with each of the rollers 19 on the spacers 18, these rollers tending to position the ring and to facilitate its rotation.

The shutter 15 is provided with mechanism suitable for moving the same relative to the conduit. As shown, this means comprises cable clamps 33 for securing the plate to cables 34, which cables pass over rollers 35 and drums 36, which latter may be actuated by crank 37 through worm 38 and gear 39, or by any other suitable mechanism. A counterweight 40 may be secured to the cable to facilitate the raising of the shutter.

With the parts in the position shown, gas may pass freely through the conduit and the opening in the shutter 15 which is in registry with the passage through conduit section 11. When it is desired to interrupt the flow of gas through the conduit, the toggle ring 26 is rotated to bring the toggle links 21 and 24 toward each other. Since the ring 9 is securely fastened to its conduit section $2^b$, the conduit section 11 is moved relative thereto and away from the ring 3, thus relieving the pressure of the annular seats 14 against the shutter 15. When the shutter 15 is free to move, the levers 37 are actuated and the cables 34 lift the shutter 15 until the imperforated portion thereof covers the passage through conduit section 11. Then the toggle ring 26 may be rotated in the opposite direction until the conduit section 11 with its annular seats 14 is brought into gas sealing contact with the shutter 15. The flexible plate 10 is made of sufficiently thin material so that the above described movement of the conduit section 11 is permitted while escape of gas between ring 9 and conduit section 11 is prevented.

It will be observed by those skilled in the art that I have provided a valve which can be most cheaply constructed because of the simplicity of the parts employed and, furthermore, that the valve is extremely easy to operate and is substantially gas-tight because of the provision of means spaced at as short intervals as may be desired about the circumference of the link to create gas sealing engagement between the link and the conduit.

The foregoing description and drawings have been given for the purpose of enabling those skilled in the art to practice my invention and not for the purpose of limiting my invention thereto. Various changes and alterations may be made in the illustrated and described structure without departing from the spirit of my invention, the scope of which is set forth in what is claimed.

What is claimed is:

1. In a conduit for fluids, in combination, two aligned, stationary conduit sections, a conduit segment interposed therebetween and movable longitudinally into the first of said sections without contacting therewith, flexible means within the said first section for supporting one end of the said segment and for preventing escape of gases between the said first section and segment, a shutter interposed between the said first segment and the second conduit section, and movable transversely of the said sections and segment, and means disposed wholly on one side of the shutter and connected to the said first conduit section and to the said segment for moving the said segment toward and away from the shutter.

2. In a conduit for fluids, in combination, two aligned, stationary conduit sections, a conduit segment interposed therebetween and movable longitudinally of said sections without contacting therewith, flexible means joining the first of the said sections for supporting the end of the said segment therefrom and for preventing escape of gases between the section and segment, and toggle means connected to the said first section and to the segment, but stopping short of the end of the segment remote from the said first section for moving the said segment relative to the said conduit sections.

3. In a conduit for fluids, in combination, two aligned, stationary conduit sections, a conduit segment interposed therebetween and movable longitudinally into the first of said sections without contacting therewith, flexible means within the said first section for supporting the adjacent end of the said segment and for preventing escape of gases between the first section and segment, toggle links secured respectively to one of the conduit sections and to the said segment, and a movable toggle ring connected to the said links.

4. In a conduit for fluids, in combination, two aligned, stationary conduit sections, a conduit segment interposed therebetween and movable longitudinally into the first of said sections without contacting therewith, flexible means within the said first section for supporting the said segment and preventing escape of gases between the first section and segment, toggle links secured respectively to the first said conduit section and to the said segment, and a rotatable toggle ring surrounding the segment and connected to the said links.

5. In a conduit for fluids, in combination, two adjacent, aligned conduit sections, and a gas tight valve cooperating therewith, the said valve including a conduit segment projecting into the first of the said sections, a flexible diaphragm supporting the said segment within the said first section and having gas tight connection with the first section and segment, means associated with the said first section and the said segment, and disposed wholly on one side of a shutter for moving the segment relative thereto, and a shutter engageable upon opposite sides by and interposed between the said conduit segment and the other of said sections, the said shutter being perforated, and means for moving the shutter to bring the perforation into or out of registry with the gas passage through the said link.

6. In a conduit for fluids, in combination with two adjacent conduit sections, a movable conduit link interposed between the said sections, means for preventing escape of gas between the first of the conduit sections and the said conduit link (and associated with the link and with the said first section,) a movable shutter disposed between and engageable by the other of said conduit sections and the conduit link, and means rotatable about the conduit link for moving the said link into and out of gas tight contact with the said shutter.

7. In a conduit for fluids, in combination with two adjacent conduit sections, a movable conduit link interposed between the sections, means for preventing escape of gas between the first of the conduit sections and the said conduit link, a movable shutter disposed between and engageable by the other of said conduit sections and the said conduit link, means for moving the conduit link with respect to the two said conduit sections, said means including toggle links attached to the conduit link and to the said first conduit section, certain of the toggle links being disposed in the projection of the shutter and means for moving the said links to actuate the said conduit link.

8. In a conduit for fluids, in combination, a conduit section having an end ring provided with a plurality of toggle links, a conduit segment cooperating with the said section and having a gas tight connection therewith, toggle links on the said conduit segment, a toggle ring connected to the said toggle links to move the conduit segment toward and away from a shutter, a second conduit section having an end ring, a shutter disposed between and engageable by the said second conduit section and the conduit segment with gas tight contact, and means for moving the shutter when the conduit segment is moved away therefrom.

9. In a conduit for fluids, in combination, two adjacent conduit sections, a movable conduit segment extending into the first of the said sections but spaced apart from the walls thereof, a flexible supporting ring connected to the said first section and segment with gas tight contact, a shutter movable between the exposed ends of the said conduit segment and the adjacent conduit section and engageable on opposite sides thereby, means rotatable about the said conduit segment and attached thereto and to the said first section for moving the segment toward and away from the said shutter and means for moving the shutter.

10. In a conduit for fluids, in combination, a conduit section having an end ring provided with a plurality of toggle links, a movable conduit segment extending into the said conduit section and provided with a plurality of toggle links, flexible supporting means for one end of the said conduit segment disposed within the said conduit section and having a gas tight connection with the said section and said segment, a rotatable ring connected to the said toggle links to move the said segment toward and away from a shutter, a second conduit section, a shutter disposed between and engageable by the said second conduit section and conduit segment with gas tight contact, and means for moving the shutter when the link is moved away therefrom.

11. In a conduit for fluids, in combination, a conduit section having an end ring provided with a plurality of toggle links, a conduit segment extending into the said section, a flexible ring having gas tight connection with the segment and with the said section and serving to support one end of the said segment for longitudinal movement relative to the section, the said conduit segment being provided with a plurality of toggle links on its exterior, a toggle ring surrounding the said segment and connected to the said links, a second conduit section, a shutter disposed between and engageable on opposite sides by the said second section and the said segment, anti-friction bearings for the said toggle ring, and means for rotating the said ring.

12. In a conduit for fluids, in combination, two aligned conduit sections spaced apart and each provided with an end ring, spacing members secured between the said rings, the said spacing members being provided with horizontally extending supporting lugs and with vertically disposed roller bearings, a valve interposed between the said conduit sections including a shutter engageable with one of the sections, a conduit segment extending into the other conduit section, the said segment having outstanding supporting lugs at one end to engage with the supporting lugs on the spacing members, flexible means within the said conduit having gas tight connection with the conduit and supporting the end of the segment projecting into the conduit section, toggle links carried by the said conduit segment and by the second said conduit section and a toggle ring surrounding the said conduit segment and engaging the said roller bearings.

13. In a conduit for fluids, in combination, two adjacent conduit sections, a movable conduit link interposed between the said sections, means for preventing escape of gas between the first of the conduit sections and the said conduit link, a movable shutter disposed between and engageable by the other of said conduit sections and the conduit link, and toggle means connected to the said first section and to the link for moving the conduit link with respect to the two said conduits, certain parts of the toggle means being disposed in the projection of the shutter.

14. A valve comprising two aligned conduit sections, a movable conduit link between the said sections, a sheet metal shutter between one of the said sections and the said conduit link and having fluid sealing contact with the said one section and the link, and means for moving the said link relative to the said sections and shutter and including a rotatable annular member surrounding the said conduit link and having toggle connections with the said conduit link and one conduit section.

15. In a conduit for fluids, in combination, two adjacent conduit sections, a movable conduit link interposed therebetween and having a gas tight connection to the first of said sections, a movable shutter disposed between and engageable by the other conduit section and the conduit link, and toggle means rotatable about the conduit link connecting the said first section and the link for moving the said link into and out of gas tight contact with the said shutter.

16. In a conduit for fluids, in combination, two adjacent conduit sections, a movable conduit link interposed between the said sections, means for preventing escape of gas between the first of the conduit sections and the said conduit link, a movable shutter disposed between and engageable by the other conduit section and the link, toggle means including links attached respectively to the conduit link and to the said first conduit section, certain of the toggle links being disposed in the projection of the shutter and means for actuating the said links.

17. In a conduit for fluids in combination with two adjacent conduit sections, a movable conduit link interposed between the said sections, means associated with the link and the first of the said conduit sections for preventing the escape of gas between the said first section and link, a movable shutter disposed between the said conduit sections and engageable with gas tight contact with the said link and with the second of the said sections, and means rotatable about the said conduit link for moving the said link into gas tight contact with the said shutter.

18. In a conduit for fluids in combination with two adjacent conduit sections, a movable conduit link interposed between the said sections, means associated with the link and the first of the said conduit sections for preventing escape of gas between the said first section and link, a movable shutter disposed between the said conduit sections and engageable with gas tight contact with the said link and with the second of the said sections, and means rotatable about the said conduit link for moving the said link out of gas tight contact with the said shutter.

In testimony whereof I hereunto affix my signature.

ROBERT E. BAKER.